May 23, 1967
T. H. ARMSTRONG ET AL
3,320,988
APPARATUS FOR CORING FRUIT HAVING SEED CELLS
Filed Nov. 9, 1964
3 Sheets-Sheet 1
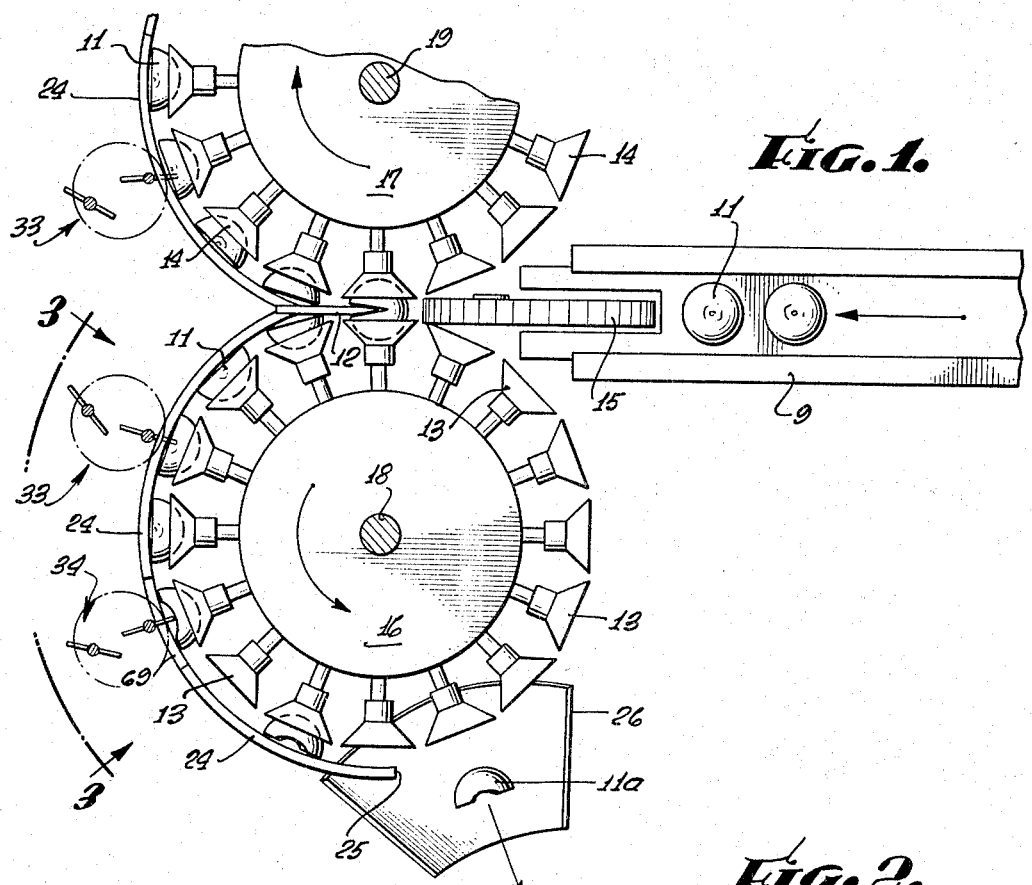
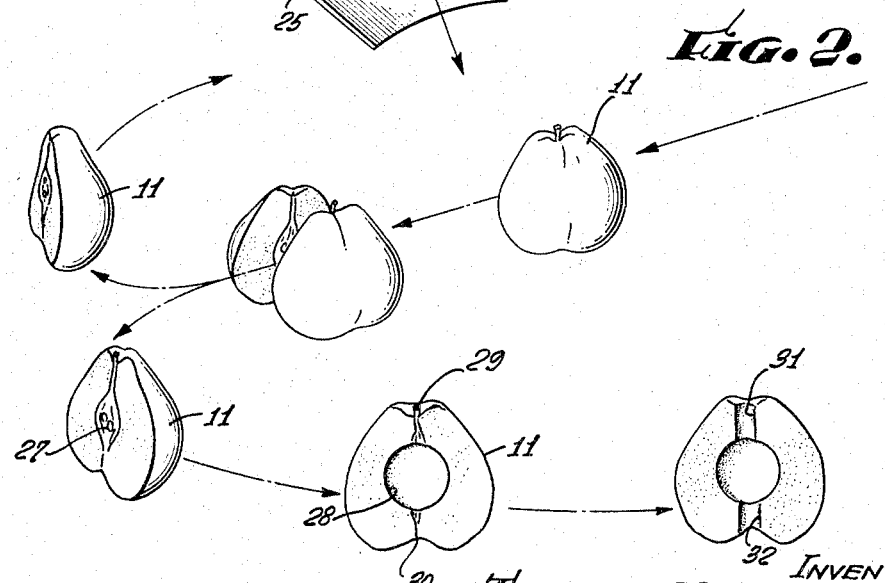
INVENTORS.
THEODORE H. ARMSTRONG
HERBERT M. GIERTH
FRANK C. LIVOTI
by Flam and Flam
ATTORNEYS.

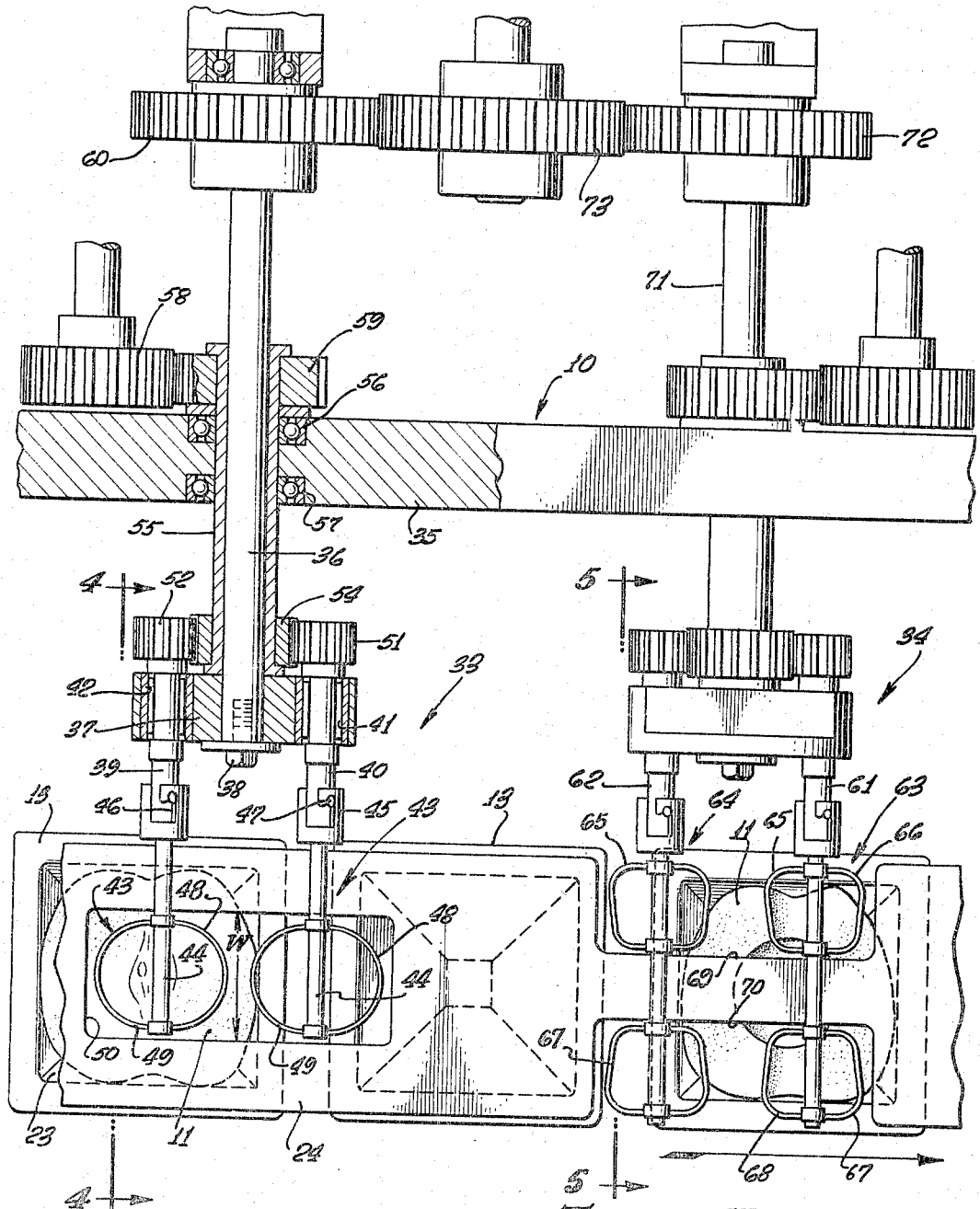

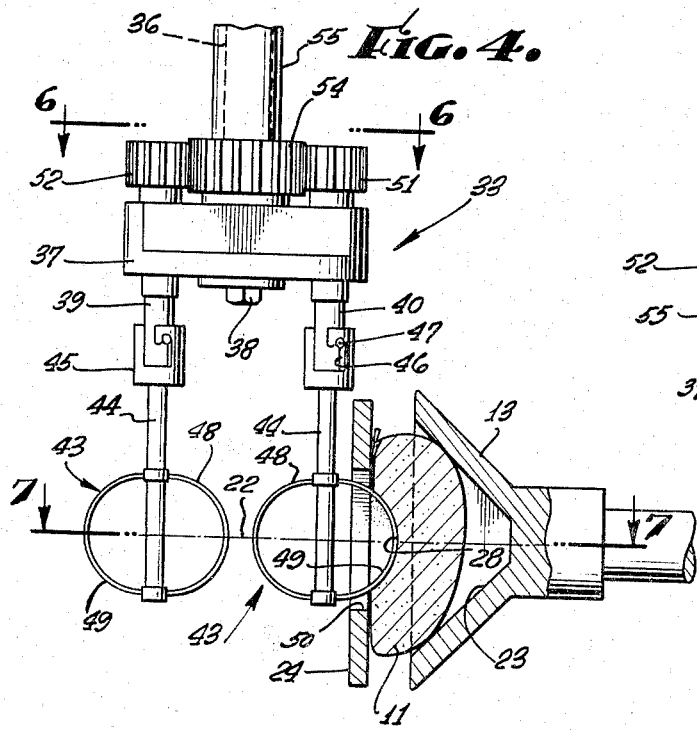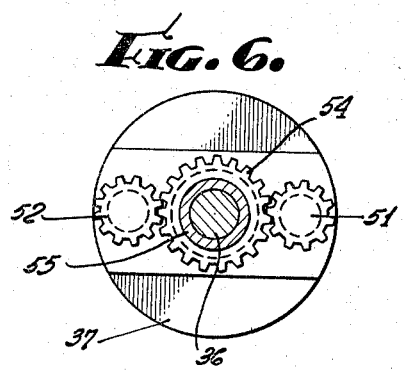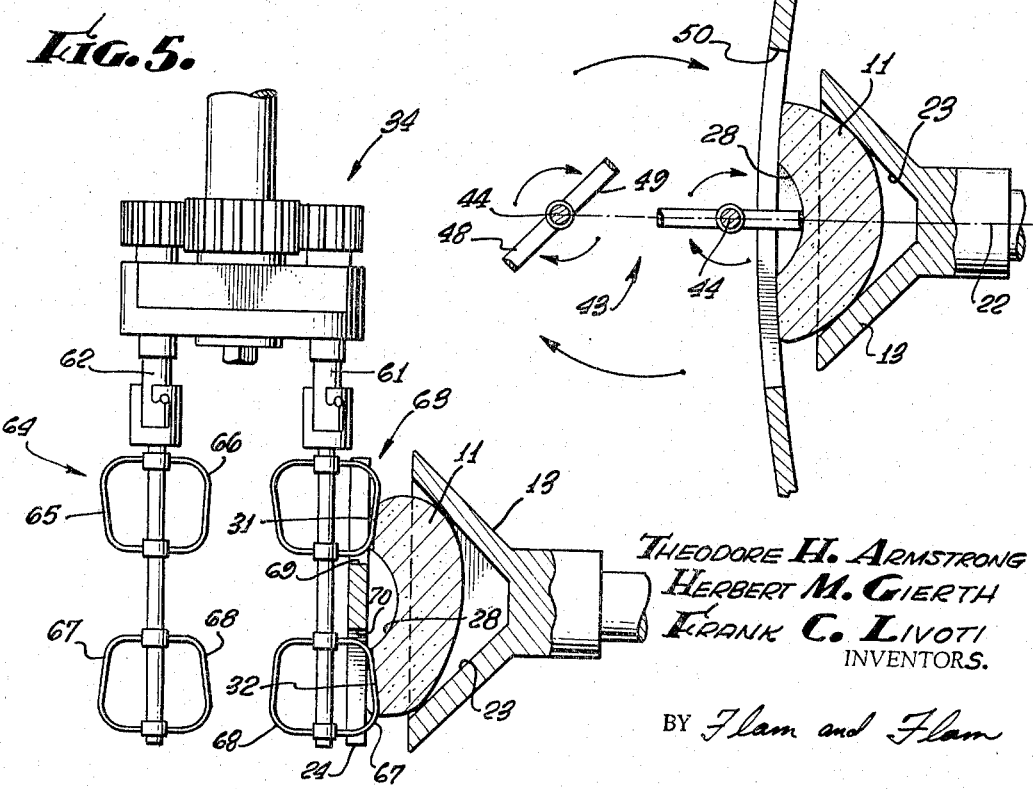

United States Patent Office 3,320,988
Patented May 23, 1967

3,320,988
APPARATUS FOR CORING FRUIT HAVING SEED CELLS
Theodore H. Armstrong, Torrance, Herbert M. Gierth, Gardena, and Frank C. Livoti, Torrance, Calif., assignors to Pacific Preserving Company, Gardena, Calif., a corporation of California
Filed Nov. 9, 1964, Ser. No. 409,784
7 Claims. (Cl. 146—52)

This invention relates to apparatus for coring apples, pears and other fruit having similar seed cells.

In a prior application of Theodore Armstrong, filed Sept. 3, 1963, Ser. No. 305,991, now Patent No. 3,270,788 and entitled, Fruit Coring Machine, there is disclosed apparatus in which the fruit is halved before the seed cell and core are removed. Each of a pair of turrets mounts a set of outwardly opening, spring-loaded, tapered cups that move in tangent paths. At a place immediately in advance of the area of tangency, the fruit is picked up and carried past a knife located at the area of tangency. The fruit halves are held in the cups by a pair of curved stainless steel guiding rails for the turrets respectively. The fruit is oriented in advance of the turrets so that the core axis falls along the cutting plane and perpendicular to the direction of motion of the halves. Each guide rail has an intermediate discontinuity where the cut surface of the fruit is exposed to revolving contoured knives that simultaneously remove the seed cell and the core. The center of the knife is enlarged so as to remove the seed cell. Piercing prongs in the cup hold the halves in position while the cutting knives operate. An ejecting pin removes the halves from the cups after the cells and cores are removed.

This apparatus has many advantages, particularly simplicity of design. But a disadvantage is that the yield is low. The cutting knives strike the fruit halves with considerable force, and consequently the cups vibrate due to their spring mounting. The result is that tolerances are not held, and too much material is removed. Also, the less prongs interfere with the proper seating action of the tapered cups, and consequently the fruit may be out of alignment with the revolving knives. This is especially true as to medium and small size fruit which is intended to be lifted as it moves inwardly of the cups.

The primary object of this invention is to improve upon such apparatus. For this purpose the cup prongs are eliminated so that the tapered cups operate effectively to center the fruit relative to the cutting knives. Furthermore, the fruit halves are more easily dislodged. In order to make this result possible, the guiding rails or strips are made continuous and the fruit is correspondingly in contact with the rails during the coring and celling process. The coring and celling are performed successively. Thus, the inward force on the fruit is reduced. A central aperture in the strip first exposes the fruit to a knife that removes the seed cell, the aperture being of sufficiently small width so that the fruit contacts the strip above and below the aperture. Notches in the upper and lower edges of the strip expose the core ends to knives while the central portion of the fruit contacts the guide rail.

Another object of this invention is to provide apparatus of this character that is simpler to keep clean and to maintain. For this purpose, the gearing and other power drive mechanisms are accommodated in an elevated casing from which the fruit contacting structures depend. The fruit particles do not clog any of the drive apparatus. Steam hoses can be effectively used.

Another object of this invention is to make possible quick and simple knife replacements.

This invention possesses many other advantages, and has other objects which may be made more clearly apparent from a consideration of one embodiment of the invention. For this purpose, there is shown a form in the drawings accompanying and forming a pair of the present specification, and which drawings, unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a partially diagrammatic horizontal sectional view of a coring machine incorporating the present invention;

FIG. 2 is a diagrammatic view illutrating the coring process;

FIG. 3 is an enlarged fragmentary side elevational view illustrating the two sets of cutters, a portion of the view being taken in axial section and as indicated by the line 3—3 of FIG. 1;

FIG. 4 is a further enlarged fragmentary sectional view taken along a plane corresponding to line 4—4 of FIG. 3;

FIG. 5 is a sectional view similar to FIG. 4 taken along a plane corresponding to line 5—5 of FIG. 3;

FIG. 6 is a transverse sectional view taken along a plane indicated by line 6—6 of FIG. 4; and FIG. 7 is a fragmentary transverse sectional view taken along a plane corresponding to line 7—7 of FIG. 4.

In FIG. 1 various components of the coring machine are illustrated. A vibrated channel 9 in this instance feeds peeled apples 11 to the coring machine. Except for the channel 9, the components illustrated in FIG. 1 are suspended from a casing 10 shown in FIG. 3. By virtue of the vibration of the channel 9 (FIG. 1), the axes of the apple cores are vertically oriented as they reach the end of the channel 9. Opposed to and spaced from the end of the channel 9 is a slitting knife 12 that extends in a vertical plane, the extension of which symmetrically bisects the channel 9. By advancing the fruit along the cutting plane of the knife 12 and maintaining the vertical orientation of the core axis, the fruit is cut precisely in two with the axis of the core falling along the cutting plane.

In order to carry the fruit past the slitting knife 12, two sets of cups 13 and 14 are provided. These sets of cups are respectively circularly arranged about axes symmetrically located on opposite sides of the cutting plane. The cups face outwardly and move synchronously substantially in circles tangent to each other at the cutting plane.

The fruit 11 is fed as by a small conveyor 15 from the end of the channel 9 to a place immediately in advance of the converging cups, whereupon the fruit is grasped between corresponding cups. The sets of cups 13 and 14 are capable of slight radial movement, and are spring-pressed outwardly and in the manner shown and described in said prior Armstrong application. Suitable stops, not shown, limit the outward movement of the cups 13 and 14. The cup sets are mounted upon turret heads 16 and 17 in turn revolvably supported by shafts 18 and 19. The cups 13 and 14 converge inwardly (FIGS. 3, 4 and 7) and accordingly form seats for the respective halves of the fruit 11. The interior cup surface 23 is preferably formed as a frustrum—a four-sided pyramid. As the cups move together to grasp the fruit, the center of the fruit is shifted so that the fruit center substantially coincides with the axis 22 of the cup. Thus, the center of the core, or seed pocket, is moved into position for subsequent processing. The fruit may be lifted or lowered depending upon the size of the fruit. The surface 23 is entirely smooth and without discontinuity so that the centering of the fruit readily takes place.

After the cups 13 and 14 move past the knife 12, the fruit halves are respectively retained in the cups by the aid of stainless steel guide rails 24. These guide rails extend semi-circularly about the respective turrets from opposite side surfaces of the slitting knife 12. As the cups pass beyond the ends of the guide rails as at 25, the fruit halves, as at 11a, fall into a chute 26 for further processing. If desired, an ejection pin may be used as, for example, as shown and described in said prior Armstrong application.

The respective halves of the fruit are similarly processed by similar equipment. A description of the apparatus for processing one half will suffice as a description of the other.

As the fruit half moves along the guide rail 24 and before it reaches the end 25 of the rail, the seed cell 27 is first removed as indicated by a substantially hemispherical cut 28 (FIG. 2). Thereafter, the stem 29 and the blossom 30 at opposite ends of the core are removed by substantially semi-cylindrical cuts 31 and 32. These cuts extend outwardly along the core axis and intersect opposite ends of the hemispherical cut 28.

In order to produce the cuts 28, 31 and 32, two separate knife assemblies generally designated at 33 and 34 (FIG. 1) are provided. The knife assembly 33 removes the seed cell 27 and forms the hemispherical cut 28; the cutter assembly 34 produces the semi-cylindrical cuts 31 and 32. The cutter assemblies 33 and 34 are angularly spaced from each other along the semi-circular course of the rail 24, the cutter assembly 33 being closer to the knife 12.

The support 37, from which the cutters 43 are suspended, is rotated in synchronism with the turret 16 so that the cutters respectively move into tangent relationship with the centers of the fruit halves in alternate cups on removable of the seed cells. The cutters have a cycloidal movement relative to the circular course of the fruit. Since there are but two cutters, the circular course of movement of the cutters about the support 37 is quite small, and thus the dwell of the tangent relationship is correspondingly small. Consequently, the dimension of the hemispherical cut along the path of movement is minimized, and yield is maximized.

The cutter assembly 33 (FIGS. 3 and 4) includes a shaft 36 that projects downwardly from the lower wall 35 of the casing 10 in exterior spaced relationship to the rail 24 (FIG. 4). At the lower end of the shaft 36, a plate 37 is attached as by the aid of a screw 38. Suspended from the plate 37 and on opposite sides of the shaft 36 are spindles 39 and 40, suitable bearing structures 41 and 42 being provided for high speed rotation of the spindles about their own vertical axes in a manner to be hereinafter described. On the lower ends of the spindles are identical detachable cutters 43. Each cutter 43 has a shaft 44 that mounts a cup or socket 45 that fits over the lower end of the corresponding spindle. The socket has a bayonet slot 46 that cooperates with a bayonet pin 47 projecting radially from the spindle in order to provide a detachable coupling. The cutter also has at its lower end a pair of arcuate blades 48 and 49, each of semi-circular form. The shaft 44 is of such length that the blades 48 and 49 are centered at the axis 22 of the cup.

The guide rail 24 (FIGS. 3 and 7) has a central aperture 50 that permits the blades of the cutters to engage the fruit. As shown in FIG. 3, the width W of the aperture 50 is just sufficient to allow passage of the blade elements 48 and 49. A substantial portion of the fruit contacts the guide rail both above and below the top edges of the top and bottom edges of the aperture 50. By using only two cutters, the length of the aperture 50 is minimized.

In order to rotate the turret shaft 18 and the cutter support 37 in synchronism, gearing to be hereinafter described is provided. By suitably timing this gearing relative to the spindle support 37, precise registry is achieved.

In order to rotate the spindles 39 and 40, planetary gears 51 and 52 (FIGS. 4 and 6) are mounted upon the upwardly projecting ends of the spindles. These gears are engaged by a sun gear 54 that is mounted upon a hollow shaft 55 that has a running fit about the shaft 36. By virtue of the arrangement of the gears, planetary movement of the cutters by rotation of the support 37 does not interfere with the high speed drive of the spindles. The hollow shaft is supported by the aid of bearing structures 56 and 57 (FIG. 3) carried by the lower casing wall 35. The hollow shaft is rotated by a drive gear 58 located in the casing 35. Gear 58 engages gear 59 mounted upon the upper end of the hollow shaft 55. The shaft 36 carries gear 60 at its upper end that is rotated by a drive gear. Lubricating oil (not shown) may be contained in the case 10 and distributed by appropriate means to the gears.

The cutter assembly 34 (FIGS. 3 and 5) for removing the blossom and stem ends of the core is similar to the cutter assembly 33. It includes spindles 61 and 62 for a pair of cutters 63 and 64 that are generally similar to the cutters 43. However, each cutter has a pair of upper blades 65 and 66 of generally U-shaped configuration and a pair of lower blades 67 and 68. The blade elements 65, 66, 67 and 68 are so located as to cooperate with the stem and blossom ends of the fruit core. The guide rail 24 has recesses 69 and 70 extending inwardly from the upper and lower edges of the rail 23 in order to provide access of the blade elements of the cutter assemblies 63 and 64 to the fruit while the center of the fruit remains in contact with the rail. The recesses 69 and 70 are just long enough to allow for the cylindrical movement of the cutters.

A pair of cutters 63, for removing the other core parts, are alternatively operable in a similar manner.

The shaft 71 for the cutter assembly 34 is rotated by a gear 72 to provide appropriate planetary or orbital motion to the blade assemblies 63 and 64. The gear 60 and the gear 72 are both operated by driving gear 73. The driving gear 73 is geared to the drive for the turret shafts 18 and 19 for purposes of synchronism.

The fruit is continuously in engagement with at least a portion of the guide rail 24 until it reaches the end edge 25 (FIG. 1) where the fruit is discharged into the chute 26.

The cutters can be readily removed simply by virtue of the simple bayonet type connection. Different cutters, of course, may be used for different fruit.

The inventors claim:
1. In apparatus for coring fruit having a seed cell at the axis of the fruit core: a set of fruit cups; means mounting the fruit cups for movement in a circuitous path; said cups being equally spaced along said mounting means; said cups each having inwardly converging surfaces; said cups opening at one side of said path for receiving fruit halves; means for successively depositing axially cut fruit halves in the cups with the fruit axis perpendicular to said path; a guide rail on said one path side and retaining said fruit halves in said cups throughout a length of said path; a first support located on said one path side; a first cutter mounted for rotation about its axis on said first support; means for moving the support synchronously with said cup mounting means for movement of said cutter axis toward and away from the cup for removal of the seed cell of the fruit half; said guide rail having an aperture for passage of part of said cutter through said guide rail, said guide rail being continuous above and below the said aperture for retaining the fruit half in the corresponding cup; a second support located on said one path side at a place spaced from said first support; a second cutter mounted for rotation about its axis on said second support; means for moving said second support synchronously with said cup mounting means for movement of the axis of said second cutter toward and away from the cup for removal of the stem and blossom ends of the core of the fruit half; said guide rail having apertures for passage of part of said second cutter through the guide rail, said guide rail being continuous along the area between the said apertures for retaining the fruit half in the corresponding cup.

2. The combination as set forth in claim 1 in which said first support is movable about an axis spaced from its cutter axis for cycloidal movement of its said cutter axis toward and away from said path, and in which said second support is movable about an axis spaced from its cutter axis for cycloidal movement of its said cutter axis toward and away from said path.

3. In apparatus for coring fruit having a seed cell at the axis of the fruit core: a set of fruit cups; means mounting the fruit cups for movement in a circuitous path; said cups being equally spaced along said mounting means; said cups each having inwardly converging surfaces; said cups opening at one side of said path for receiving fruit halves; means for successively depositing axially cut fruit halves in the cups with the fruit axis perpendicular to said path; a guide rail on said one path side and retaining said fruit halves in said cups throughout a length of said path; a first support located on said one side of said path; means rotating said first support about an axis substantially parallel to the fruit axes and in synchronism with said cup mounting means; a first pair of cutters; means mounting the cutters of the first pair on opposite sides of the support axis for rotation about their own axes; said cutters having blades designed successively to engage fruit halves of alternate cups at the center of the fruit halves for removal of the seed cells thereof; said guide rail having an aperture for passage of said blades through the guide rail, said guide rail being continuous above and below the said aperture for retaining the fruit half in the corresponding cup; a second support located on said one side of said path; means rotating said second support about an axis substantially parallel to the fruit axes and in synchronism with said cup mounting means; said second support being spaced from said first support along the length of said path; a second pair of cutters; means mounting the cutters of the second pair on opposite sides of its support axis for rotation about their own axis; said cutters having blades designed successively to engage fruit halves of alternate cups at the blossom and stem ends of the fruit core for removal of portions of the fruit core; said guide rail having apertures for passage of said blades through the guide rail, said guide rail being continuous along the area between said apertures for retaining the fruit half in the corresponding cup.

4. In apparatus for coring fruit having a seed cell at the axis of the fruit core: a set of fruit cups; means mounting the fruit cups for movement in a circuitous path; said cups being equally spaced along said mounting means; said cups each having inwardly converging surfaces; said cups opening at one side of said path for receiving fruit halves; means for successively depositing axially cut fruit halves in the cups with the fruit axis perpendicular to said path; a guide rail on said one path side and retaining said fruit halves in said cups throughout a length of said path; a first support; a first rotary shaft mounting said first support on one side of said path; said rotary shaft having an axis substantially parallel to said fruit axes; a pair of spindles mounted on said first support for rotation about parallel axes on opposite sides of said rotary shaft axis, and projecting above and below said support; planetary gears mounted on the upper ends of said spindles; a first hollow shaft surrounding said first rotary shaft; a sun gear carried by said hollow shaft and engaging both of said planetary gears; means rotating said first hollow shaft; a pair of cutters detachably coupled to the lower ends of said spindles; means rotating said first rotary shaft in synchronism with said cup mounting means to impart orbital movement to said cutters; said cutters having blades designed successively to engage fruit halves of alternate cups at the center of the fruit halves for removal of the seed cells thereof; said guide rail having an aperture for passage of said blades through the guide rail, said guide rail being continuous above and below the said aperture for retaining the fruit half in the corresponding cup; a second support; a second rotary shaft mounting said second support on said one side of said path; said second rotary shaft having an axis substantially parallel to said fruit axes; a pair of spindles mounted on said second support for rotation about parallel axes on opposite sides of the axis of said second rotary shaft, and projecting above and below said support; planetary gears mounted on the upper ends of the said spindles of said second support; a second hollow shaft surrounding said first rotary shaft; a sun gear carried by said second hollow shaft and engaging both of said planetary gears; means rotating said second hollow shaft; a pair of cutters detachably coupled to the lower ends of the spindles of said second support; means rotating said second rotary shaft in synchronism with said first rotary shaft to impart orbital movement to said cutters; said cutters having blades designed successively to engage fruit halves of alternate cups at the blossom and stem ends of the core for removal thereof; said guide rail having apertures for passage of said blades through the guide rail, said guide rail being continuous along the area between said apertures for retaining the fruit half in the corresponding cup.

5. In apparatus for coring fruit: a casing; a pair of turrets; a pair of turret shafts suspended from the casing and having lower free ends; said turrets being respectively secured to the said lower ends of said turret shafts; fruit cups mounted by the turrets respectively for movement in substantially tangent paths; and a cutter assembly for each of the turrets, each cutter assembly having a support, a rotary shaft depending from the casing and having a lower free end mounting the support, and a cutter eccentrically mounted on said support for cycloidal movement relative to the path of said cups.

6. The combination as set forth in claim 5 in which each cutter assembly includes a planetary shaft supported for rotation by the corresponding support, the lower end of the planetary shaft being free, a bayonet slot and pin connection between the upper end of the cutter and the lower end of the planetary shaft to provide the sole support for the cutter, and means for rotating the planetary shaft.

7. The process of coring fruit having a seed cell and a core axis, which comprises: splitting the fruit along the core axis; moving the fruit in a path with the core axis substantially perpendicular to the path while holding the section plane of the fruit against a guide rail; exposing the seed cell of the fruit through the rail at one position along the path and cutting the seed cell therefrom; exposing the blossom and stem ends of the fruit through the rail at another position along the path and cutting the blossom and stem portions therefrom; and continuously restraining the fruit by the aid of said rail during said cutting operations.

References Cited by the Examiner

UNITED STATES PATENTS

| 972,812 | 10/1918 | Burns | 146—52 |
| 2,007,558 | 7/1935 | Bem | 146—52 |
| 2,614,593 | 10/1952 | Arengo-Jones | 146—40 |

FOREIGN PATENTS

| 235,872 | 6/1911 | Germany. |

DONALD R. SCHRAN, *Primary Examiner.*